United States Patent [19]

Van Brakel

[11] 3,822,431
[45] July 9, 1974

[54] HUBCAP AND LOWER DETAIL WASHER FOR AUTOMOBILES
[75] Inventor: Russel A. Van Brakel, Harshaw, Wis.
[73] Assignee: Haverberg Auto Laundry Equipment Co. Inc., Chicago, Ill.
[22] Filed: Nov. 22, 1972
[21] Appl. No.: 308,671

[52] U.S. Cl. .............................. 15/21 D, 15/DIG. 2
[51] Int. Cl. ............................................. B60s 3/06
[58] Field of Search............ 15/DIG. 2, 21 R, 21 D, 15/21 E, 21 C; 134/123, 45

[56] References Cited
UNITED STATES PATENTS
2,716,767  9/1955  Davis .................................. 15/21 C
2,822,564  2/1958  Crivelli ............................... 15/21 D
3,434,173  3/1969  Kenyon et al. ...................... 15/21 D
3,643,272  2/1972  Rickel ................................. 15/21 D Primary Examiner—Edward L. Roberts

[57] ABSTRACT

A mechanism for washing the hubcaps and lower detail of an automobile including a horizontally disposed, pivotally mounted framework biased toward the path of an automobile passing through an automatic automobile washing apparatus. The framework supports a pair of horizontally disposed, driven brushes which are adapted to contact and wash the lower detail of the automobile as well as the hubcaps. Similarly mounted upon the framework is a vertically disposed, driven brush which is included to assure that the hubcap is completely cleaned.

5 Claims, 3 Drawing Figures

PATENTED JUL 9 1974  3,822,431
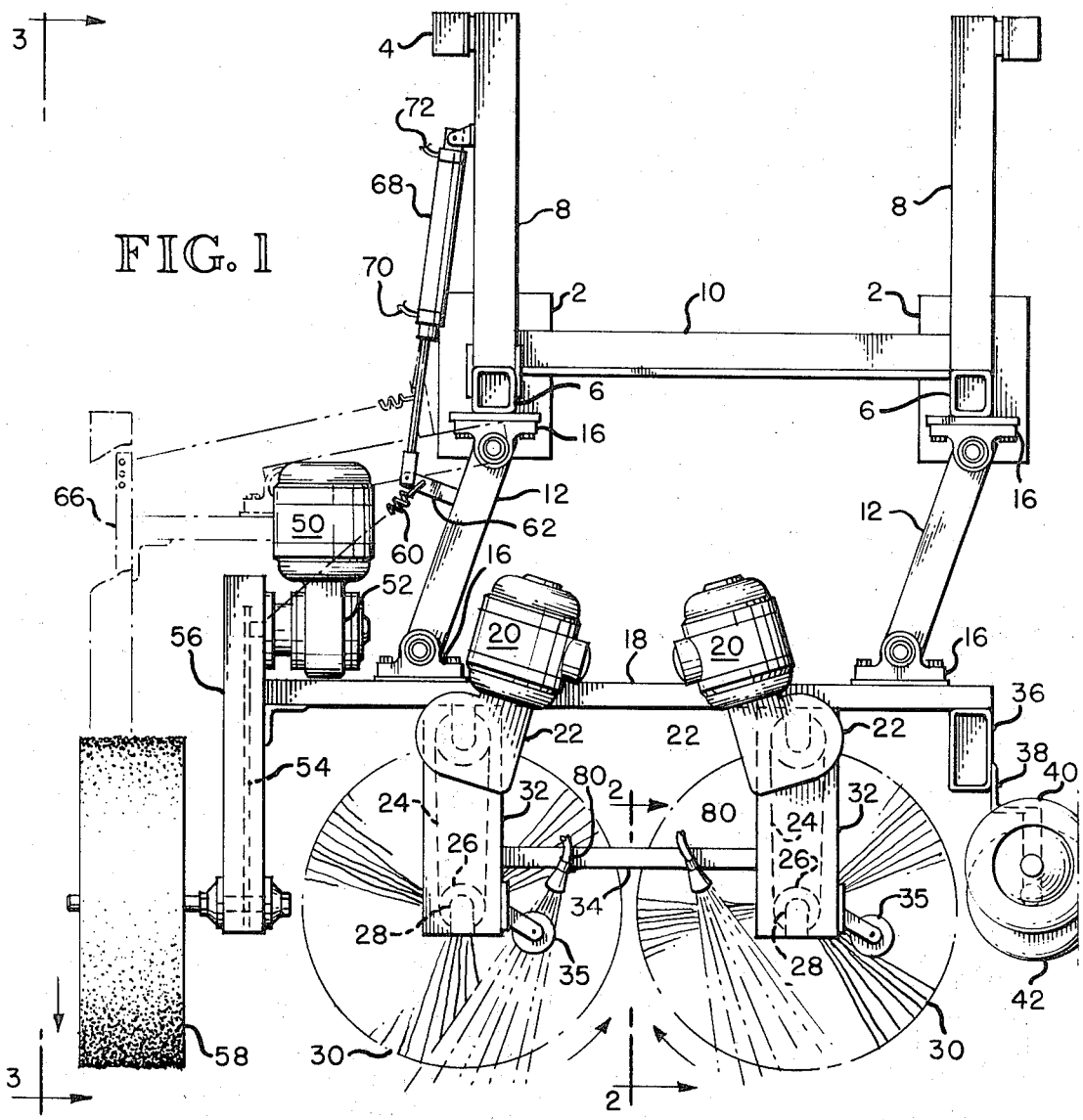
FIG. 1
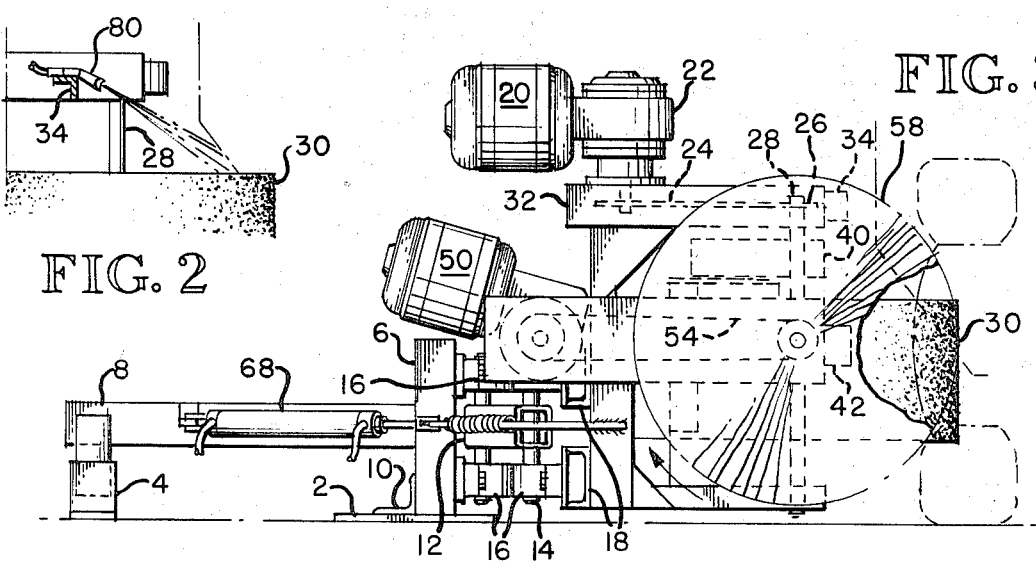
FIG. 2
FIG. 3

HUBCAP AND LOWER DETAIL WASHER FOR AUTOMOBILES

BACKGROUND OF THE INVENTION

With the advent of the contoured look in automobiles the designers have configured the outer portion of the vehicle such that it curves under and does not terminate in a sharp detail line at the bottom portion of the body. While this contouring of the automobile has proven to be pleasing to the eye and desirable to the car buyers, it has presented a problem with respect to cleaning the car. Because this portion faces downwardly it tends to gather a greater quantity of grime. Because the contouring extends inwardly beyond the plane formed by the exterior of the tire, this portion of the automobile is extremely difficult to clean, particularly by automatic washers.

Another detail of the automobile which has proved to be difficult to clean by means of automatic apparatus, is the hubcap and outer wheel face. The hubcaps on automobiles have, as is well known, different contours and configurations. The hubcaps generally extend outwardly a substantial distance from the hub at the center portion and yet go in to a location immediately adjacent the wheel at the outer edges, a contour extremely difficult to follow without human guidance.

One approach to the hubcap washing problem is taught by U.S. Pat. No. 3,643,275 granted to Van Brakel on Feb. 22, 1972. The approach in the above entitled patent includes an angled brush which has a beveled surface and which is located adjacent the wheel washing apparatus. This teaching relies upon the rapid rotational movement imparted to the wheel during the wheel washing operation to scrub the hubcaps. Whereas this approach has been partially successful as far as cleaning the hubcaps on an automatic basis, it has not assisted at all in cleaning the curved under detail or corner of the body.

Another approach to the problem is taught by U.S. Pat. No. 3,346,895 granted Oct. 17, 1967, to R. G. Consolo. This apparatus comprises an elongated rotatable brush which is adapted to contact the lower portion of the tire as it passes the apparatus. This apparatus is probably suitable for washing the sidewall of the tire but it is not intended to wash the hubcap and lower detail and therefore does not solve that particular problem. It is to be noted also that the outer portion of the Consolo apparatus is mounted on a pair of parallel arms which are placed at an angle to the horizontal such that gravity continuously forces the apparatus outwardly. This biasing means may be satisfactory for tire sidewall washing where the brush will remain in contact with the car and the interface will be in approximately the same plane during the entire washing process, however it has not proved satisfactory for hubcap and lower detail washing where the apparatus must move inwardly and outwardly relative to the car being washed as it passes the washing station to assure that a complete washing is accomplished.

With the above noted problems and attempted solutions in mind, it is an object of the present invention to provide a novel automatic mechanism for cleaning the hubcap and lower detail as the automobile is transported by a washing station.

It is another object of the present invention to provide an automatic mechanism which has a pair of horizontally disposed brushes mounted so that they are urged into continual contact with the hubcap and wheel portion of the automobile and further including a vertically disposed brush which is adapted to contact the under body portion of the automobile and clean same.

It is another object of the present invention to provide an automatic mechanism for use in an automatic car washing apparatus which will quickly and efficiently scrub both the hubcap, an area plan difficult to clean, and the contoured lower body portion which faces towards the ground or supporting surface thus making it extremely difficult portion to clean automatically with the necessary consistency.

BRIEF DESCRIPTION OF THE DRAWINGS

FIG. 1 is a planned view of the subject hubcap and under body detail washing mechanism.

FIG. 2 is an enlarged detail showing the relative location of the washing liquid nozzle and the horizontally disposed brush mechanisms.

FIG. 3 is a sectional view taken along lines 3—3 of FIG. 1.

DETAILED DESCRIPTION OF THE DRAWINGS

As seen in FIGS. 1 and 3, the hubcap and lower detail washer are supported by a rigid framework supported in position above the floor by means of anchor plates 2 uprights 4 and 6 frame members 8 extending generally perpendicular to a line of travel of automobile and interconnecting member 10 which extends generally horizontal to the path of an automobile being washed. Mounted to the upright 6 on the side nearest to the path taken by an automobile are a pair of parallel arms 12 mounted between vertical rods 14 extending between trunion members 16. The trunion members 16 located at the outboard ends of parallel arms 12 are secured to a substantially horizontal rigid cross-member 18 such that the combination of the parallel arms 12, the rigid cross-member 18 and a line between the inboard trunion members 16 form a parallelogram. The parallelogram configuration assures that the cross-member 18 always substantially parallels the path of an automobile being urged through the washing apparatus.

Secured to the rigid cross-member 18 are a pair of motors 20 which drive through a transmission member 22 to reduce the speed of rotation as well as changing the angle of drive. The torque is then transmitted via a chain 24 to a pulley 26 keyed to a vertical rod 28.

Mounted to rods 28 are horizontally disposed brushes 30 which are of a relatively soft fiber such that they will conform to the contours of a passing automobile assuring the cleaning of the hubcap and the lower detail area. It is to be understood that although the preferred embodiment includes a motor 20, transmission 22 as well as the remainder of the drive train, it is not critical to the present invention and the drive train could be of any desired mechanism.

Enclosures 32 both protect and add stability to the drive train described in detail heretofore, and are interconnected by means of a second cross-member 34 such that the two brushes 30 operate as a single rigid unit. A wheel 35 is mounted to the outer, upstream of the housing 32 such that if the brush 30 were to become dislodged or worn to the point where danger to the automobile finish is presented by the bristle supporting mechanism, the wheel 32 would contact the automobile surface causing the entire mechanism to move out of the path of the automobile preventing contact with the automobile by a finish damaging portion.

Mounted at the upstream of the rigid cross-member 18 is a vertical structural member 36 which supports brackets 38 which in turn support a pair of guide wheels 42 placed in axially offset position. Wheels 42 contact different portions of the automobile and are placed such that they will initially contact an automobile to be washed assuring that the mechanism will be moved out of the way to a point whereat future contact will be with the brushes and not cause damage to an automobile. The placement of the brushes is critical to the safety, recognizing that automobiles have distinct outer profiles.

Mounted to the rearward end of the rigid cross-member 18 is a third motor 50 driving through a transmission 52 and a chain drive 54. The chain drive is contained and protected by housing 56. Chain drive 54 causes rotation of a vertically disposed brush 58 which, as can be seen in FIG. 3, contacts the curved under lowered detail portion of the body as well as assuring that the entire hubcap is washed.

The entire mechanism outboard of the parallel arms 12 is continuously urged toward its outermost position by means of a compression spring 60. Spring 60 is mounted between a rigid arm 62 secured to one of the parallel arms 12 and a bar 66 which is mounted to the bottom portion of housing 56.

As can be seen in phantom in FIG. 1, when the entire outboard mechanism is moved to the left as seen in this figure or rearwardly from the vehicle path, it puts the spring 60 in tension thus generating a self-returning force to move it to a forwardmost position.

Mounted to arm 62 is a fluid shock absorber 68 having a restricted valve between the two ports 70, 72 such that rapid movement in either direction is resisted resulting in a stabilized mechanism assuring a consistent wash.

Referring now to FIG. 2 it can be seen that mounted upon the interconnecting bar 34 extending between the brush drive housing is a nozzle 80. Although only one nozzle is shown in detail, reference to FIG. 1 shows that the preferred embodiment incorporates one nozzle for each of the horizontally disposed brushes. During operation, the pair of nozzles 80 continuously spray a washing solution which is directed to the point of contact between the brush 30 and the automobile.

Referring now particularly to FIG. 3, the relative position of the brush 30, the brush 58 and the profile and hubcap or outer wheel portion of the vehicle can readily be seen. It becomes immediately apparent that the present configuration of brushes and placement thereof as well as the continuous controlled urging of the mechanism in an outward direction provides a rapid and reliable method of washing the hubcaps and lower detail of the automobile.

The embodiments of the invention in which an exclusive property or privilege is claimed are defined as follows:

1. A washing apparatus for cleaning the hubcaps and lower inwardly-sloped countoured portion of an automobile passing along a travel path through an autmobile laundry comprising;

an elongated horizontal brush support means biased to move toward and parallel to the travel path;

a pair of horizontal counter-rotating side-by-side rotary cleaning brushes journal-mounted in the support means at a level to horizontally wipe the hubcaps;

a vertical rotary brush also journal-mounted on the support means and arranged to reach toward the travel path approximately the same extent as the pair of brushes, the vertical brush extending above and below the top and bottom level of the pair and arranged to vertically wipe the contoured portion of the automobile;

means on the support means for rotating the brushes, and means on the support means for applying a cleaning agent adjacent at least one of the brushes.

2. A washing apparatus according to claim 1 in which the vertical brush wipes downwardly.

3. A washing apparatus according to claim 2 in which the pair of brushes wipe toward one another.

4. A washing apparatus according to claim 1 in which the vertical brush wipes downwardly above the level of the pair of brushes into the level.

5. A washing apparatus according to claim 1 in which the pair of brushes is closer than the vertical brush to the start of the travel path.

* * * * *